(12) United States Patent
Tunis

(10) Patent No.: US 6,601,357 B2
(45) Date of Patent: Aug. 5, 2003

(54) UN-REINFORCED THERMOPLASTIC COATING

(76) Inventor: George Tunis, 5711 Waterside Dr., Berlin, MD (US) 21811

( * ) Notice: Subject to any disclaimer, the term of this patent is extended or adjusted under 35 U.S.C. 154(b) by 0 days.

(21) Appl. No.: 09/942,791

(22) Filed: Aug. 29, 2001

(65) Prior Publication Data

US 2002/0050116 A1 May 2, 2002

Related U.S. Application Data

(60) Provisional application No. 60/230,398, filed on Sep. 6, 2000.

(51) Int. Cl.[7] .............................................. B32B 21/08
(52) U.S. Cl. .......................... 52/480; 52/408; 52/309.1; 52/392; 52/390
(58) Field of Search ................................ 52/480, 403.1, 52/408, 309.1, 309.5, 392, 390, 391

(56) References Cited

U.S. PATENT DOCUMENTS

| | | | | |
|---|---|---|---|---|
| 1,487,255 A | * | 3/1924 | Magelssen | 286/191 |
| 3,941,904 A | | 3/1976 | Hoh et al. | 427/207 |
| 4,190,686 A | | 2/1980 | Muis | 427/317 |
| 4,323,615 A | | 4/1982 | Sauder | 428/121 |
| 4,496,613 A | | 1/1985 | Zagefka et al. | 427/440 |
| 4,526,418 A | * | 7/1985 | Martin | 296/182 |
| 5,187,000 A | | 2/1993 | Chow et al. | 428/141 |
| 5,198,481 A | | 3/1993 | Cope | 524/9 |
| 5,207,172 A | | 5/1993 | Wolter | 114/357 |
| 5,236,754 A | * | 8/1993 | McBride et al. | 428/55 |
| 5,273,787 A | | 12/1993 | Gnatowski | 427/408 |
| 5,336,304 A | | 8/1994 | Andoe | 106/18.32 |
| 5,380,131 A | | 1/1995 | Crawford | 405/216 |
| 5,509,715 A | * | 4/1996 | Scharpf | 296/181 |
| 5,719,239 A | | 2/1998 | Mirous et al. | 525/427 |
| 5,928,735 A | * | 7/1999 | Padmanabhan et al. | 428/33 |
| 5,968,630 A | * | 10/1999 | Foster | 428/77 |
| 5,985,397 A | | 11/1999 | Witt et al. | 428/44 |
| 6,077,610 A | | 6/2000 | Cowell et al. | 428/413 |
| 6,124,393 A | | 9/2000 | Haraguchi et al. | 524/492 |
| 6,179,942 B1 | * | 1/2001 | Padmanabhan | 156/153 |
| 6,183,824 B1 | * | 2/2001 | Padmanabhan et al. | 428/33 |
| 6,318,794 B1 | * | 11/2001 | Berube | 296/182 |

* cited by examiner

*Primary Examiner*—Carl D. Friedman
*Assistant Examiner*—Basil Katcheves
(74) *Attorney, Agent, or Firm*—Merchant & Gould P.C.

(57) ABSTRACT

The present invention concerns an adhesive bonded thermoplastic coating for the underside of a floor that will add significant moisture resistance, wear resistance, transverse crack resistance, and make a better looking, more marketable product. The plastic coated vehicular trailer floor has a plurality of wood planks having a top surface, a bottom surface and a first and second side surfaces, the plank having a width that is less than the lateral width of the floor, each plank being formed by a plurality of boards arranged side-by-side, each board being formed of a plurality of segments joined end-to-end to one another by shaped coupling portions. The planks are arranged side by side such that at least one of the first and second side surfaces faces one of the second or first side surfaces of adjacent planks. Each of the planks has a planar polymer layer formed of an un-reinforced polymer, being bonded to the bottom surface of the planks with an adhesive layer. The adhesive is an epoxy or reactive hot-melt urethane adhesive (but could be any adhesive including urethane, acrylic, hot melt, polyester, vinyl-ester, reactive hot-melt urethane or other equivalent) and the polymer is a PVC thermoplastic sheet (could be any thermoplastic sheet including PET, Polyurethane, Polyurea, Polyethylene, polypropylene, ABS or other equivalent).

19 Claims, 4 Drawing Sheets

(3 of 4 Drawing Sheet(s) Filed in Color)

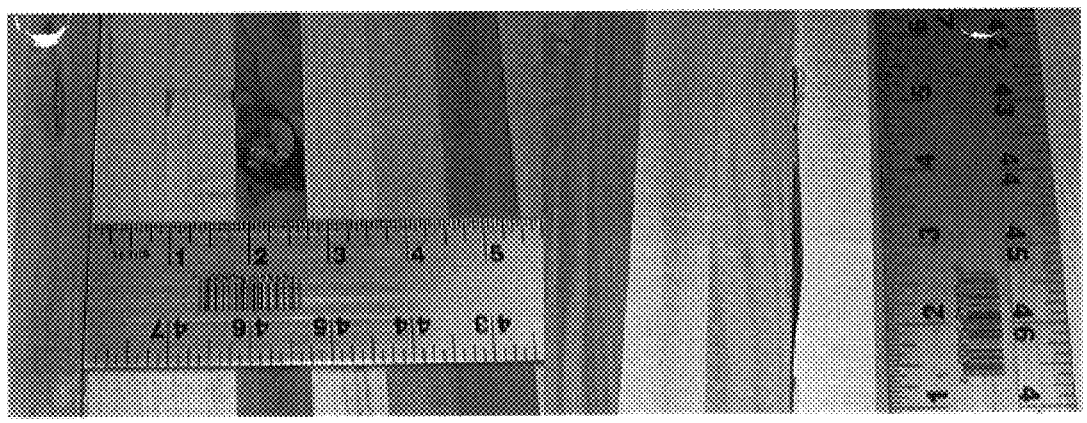
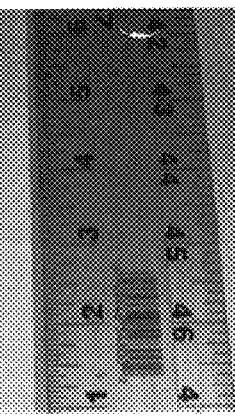
Figure 1     Figure 2
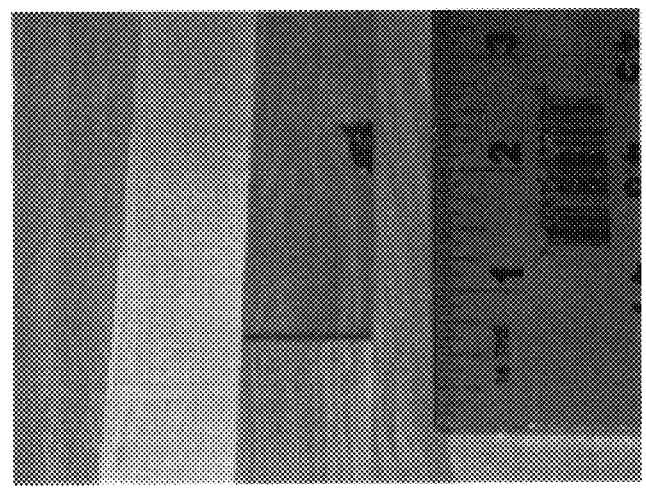
Figure 3
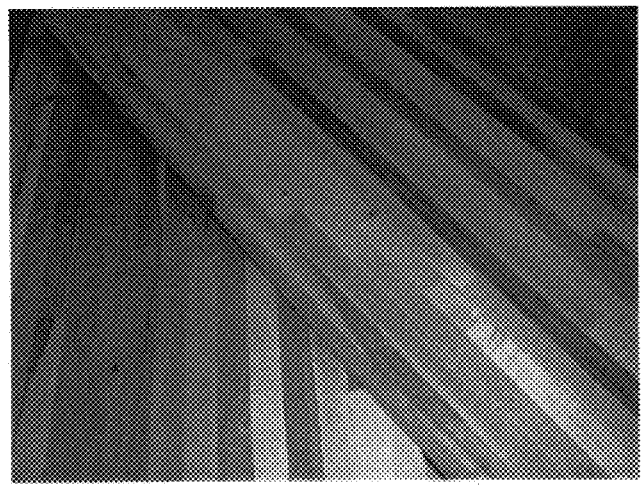
Figure 4

UN-REINFORCED THERMOPLASTIC COATING

This application claims the benefit of Provisional application Ser. No. 60/230,398, filed Sep. 6, 2000.

FIELD OF THE INVENTION

The present invention relates to the field of thermoplastic coatings, particularly suitable for use with wood floors, and more particularly for such wood floors in trucks, vans, cars, railcars and containers, etc.

DESCRIPTION OF THE PRIOR ART

Currently high-strength hardwood floors are manufactured by cutting hardwood planks into small strips (approximately ¾" to 1.15" or 1.90 cm to 2.9 cm) and subsequently reassembling the strips into 12 in. (approximately 30.5 cm) wide 50 ft. long. (approximately 15.24 m) truck floor planks. The planks are then assembled side by side to form the floor.

The small strips range in length from one foot (30.5 cm) to eight feet (2.44 m). The wide variation in length is due primarily to the removal of defects during manufacture.

These defects are the result of variations in the raw wood supply and they are removed for both structural and cosmetic reasons. Once the strips are sorted, they are glued together using a melamine adhesive (or any suitable glue) that is cured in an RF press. After the assembled plank exits the RF press, it is planed to final thickness. At this phase in the manufacturing operation, cosmetic defects are repaired and the boards are prepped for painting.

The prepared planks are then sent through an automated painting line where they are coated with approximately 7 to 8 mils of water-based paint. After the painting process, the boards are prepared for shipment.

The paint is a water based undercoat and has a low viscosity, so during the curing process some of the paint goes into the wood to be mixed with the fibre of the wood (the paint-wood composite layer). The heat of the curing makes the water evaporate leaving the majority of the solid part of the paint at the surface protecting the wood. At the end of the curing process, the coating of the pure paint protecting the wood is reduced to approximately 3 to 4 mils. Because of the low viscosity and the thin coating protection, the paint does little to hide any imperfection in the wood panel.

Once the pure paint layer is broken at the surface, the paint-wood composite layer can begin to wick moisture into the system via the exposed wood fibers contained in the paint-wood composite. This moisture wicking action serves to hasten the breakdown of the coating.

The primary role of the paint system is to protect the wood, and especially the glue joints, from moisture during the service life of the floor. Based on long term testing in the field, it has been observed that the paint system breaks down after approximately one year in service, with the greatest degradation occurring at the trailer wheel locations. At these key points in the floor, the wood is subjected to an intense spray of water and various road debris that work to weaken the paint and the underlying wood grain, resulting in a quick breakdown of the coating system. Once the paint has broken down, the wood begins to absorb moisture on the roadside of the floor, resulting in warping, uneven swelling stresses, and worst of all, the degradation of the bond in the glue lines of the floor.

Once sufficient moisture has penetrated, the wood grain just inside of the glue lines weakens and the floor can begin to fail. Additionally, once the coating has broken down, water can migrate into the container itself, resulting in product damage. This result is only intensified if the floor warps or swells unevenly. Since the paint system has little or no ability to absorb strain (the ability to stretch) any swelling of the floor leads to immediate cracks in the paint (especially at the glue lines) and further intensifies the problem.

One area of the floor of particular interest is the zone surrounding the end of each hook joint. These areas generally occur 5 to 6 places in each square foot of floor (or 929 $cm^2$), and represent the single largest cause of failure of the paint. Because a small discontinuity exists at each joint and because the current paint system is unable to bridge this discontinuity, the uneven swelling stresses described above are at a maximum at these locations. In typical use, the paint system will develop a small crack at the joints. This crack will begin to allow moisture into the joint, and since the end grain of the wood is fully exposed at this location, the moisture will quickly wick into the stick end causing an uneven, transverse swelling stress. This uneven swelling stress will further crack the paint along the length of the stick, affecting a growing area around each joint. As described above, this swelling and cracking mechanism will work to quickly destroy the paint system at the most critical zones, around the glue joints, and will result in the ultimate destruction of the structural capability of the floor.

SUMMARY OF THE INVENTION

It is an object of the present invention to provide an adhesive bonded thermoplastic coating for the underside of a floor as described above that will help solve all of the limitations of the current system, add significant moisture resistance, wear resistance, transverse crack resistance, and make a better looking, more marketable product. In accordance with the invention, this object is achieved with a plastic coated vehicular surface floor having a longitudinal length and a lateral width, said plastic coated vehicular trailer floor comprising:

a. a plurality of wood planks extending longitudinally up to a length substantially equal to the longitudinal length of said floor, each plank having a top surface, a bottom surface opposite said top surface, and a first and second side surfaces extending between said top surface and said bottom surface, where said plank has a width that is less than the lateral width of said floor, each plank being formed by a plurality of boards arranged side-by-side, each board being formed of a plurality of segments joined end-to-end to one another by shaped coupling portions;

b. said plurality of planks being arranged side by side such that at least one of said first and said second side surfaces of each of said planks faces one of said second or first side surfaces of adjacent planks to form the floor, a joint region being formed at locations at which said first side surface faces said second side surface of adjacent planks.

c. each of the plurality of planks of said floor system further comprising a substantially planar polymer layer formed of an un-reinforced polymer, said polymer layer being substantially continuously bonded to said bottom surface of each of the plurality of planks with an adhesive layer and extending unitarily substantially across the width and along the longitudinal length of each plank, the upper surface of each of the plurality of planks being uncoated by the un-reinforced polymer layer, where said plastic polymer layer possesses a modulus of elasticity less than that of the wood.

In a preferred embodiment, the adhesive is an epoxy or reactive hot-melt urethane adhesive (but could be any adhesive including urethane, acrylic, hot melt, polyester, vinylester, reactive hot-melt urethane or other equivalent) and the polymer is a PVC thermoplastic sheet (could be any thermoplastic sheet including PET, Polyurethane, Polyurea, Polyethylene, polypropylene, ABS or other equivalent).

BRIEF DESCRIPTION OF THE FIGURES

The patent or application filed contains at least one drawing executed in colour. Copies of this patent or patent application publication with coloured drawing(s) will be provided to the United States Patent and Trademark Office upon request and payment of the necessary fee. The following description of the invention will be better understood by reading the following text in conjunction with the accompanying drawings, in which:

FIG. 1 is a photograph of average knot defect in wood floor;

FIG. 2 is a photograph of average split seam defect in wood floor at the glue line location;

FIG. 3 is a photograph of hook joint gap defect in wood flooring;

FIG. 4 is a photograph of completed wood boards with defects repaired and prepared for painting;

DESCRIPTION OF A PREFERRED EMBODIMENT OF THE INVENTION

In order to aid in comprehending the context of the present invention, reference will be made to the figures in order to illustrate some of the issues raised in the background of the invention.

Figure 5:
FIG. 5 is a photograph of wood plank which has been painted, ready for installation.
Figure 6:
FIG. 6 is a photograph of installed wood flooring on a truck chaise (note visible defect repairs in paint)
Figure 7:
FIG. 7 is a photograph of truck floor undercoat paint peeling after 1 year of service.
Figure 8:
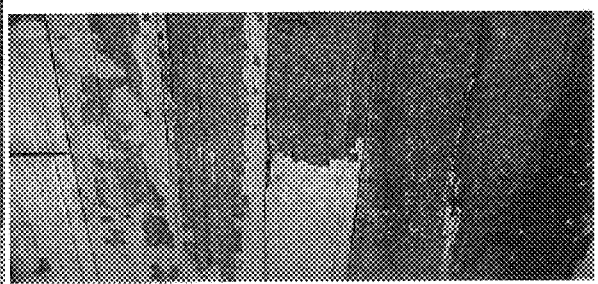
FIG. 8 is a photograph of truck floor undercoat paint showing near complete degradation after 1.5 years of service. Note accentuated hook joint and split at glue line.
Figure 9:
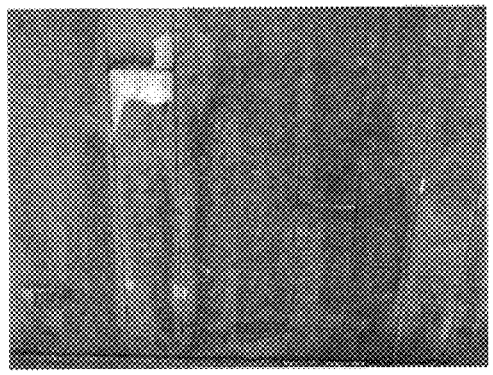
FIG. 9 is a photograph of hook joint defect causing breakdown of undercoat paint system.
Figure 10:
FIG. 10 is accentuated hook joint swelling and subsequent board splitting and coating failure.
Figure 11:
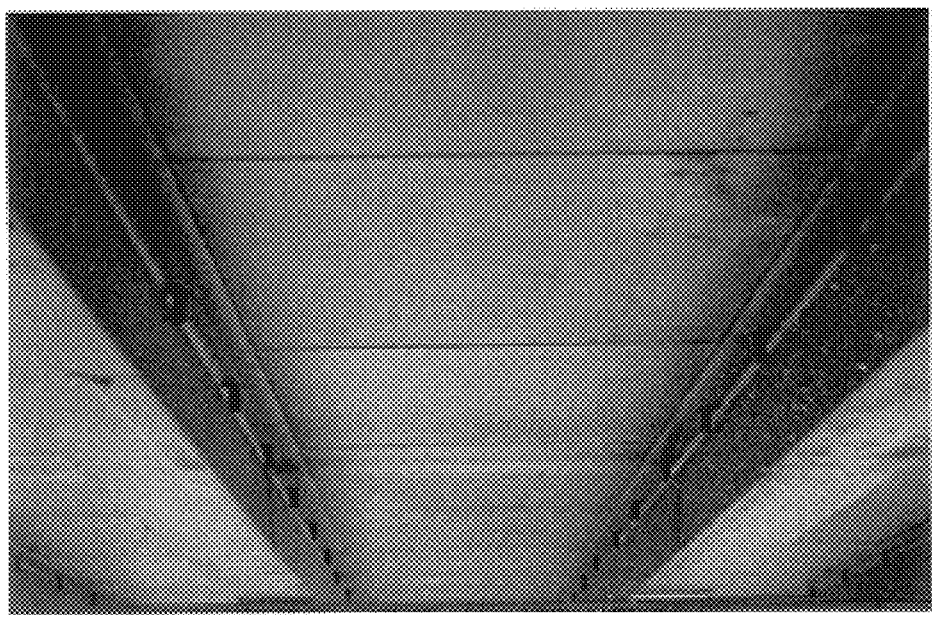
FIG. 11 is a photograph of installed thermoplastic undercoat system on truck chassis.

FIG. 1 is a photograph of average knot defect in a wood floor. FIG. 2 is a photograph of the average split seam defect in wood floor at the glue line location. FIG. 3 is a photograph of hook joint gap defect in wood flooring. FIG. 4 is a photograph of completed wood boards with defects repaired and prepared for painting. FIG. 5 is a photograph of wood plank which has been painted according to the prior art and ready for installation. FIG. 6 is a photograph of an installed wood flooring on a truck chassis (note visible defect repairs in paint). FIG. 7 is a photograph of a truck floor undercoat paint peeling after 1 year of service; where FIG. 8 is a photograph of a truck floor undercoat paint showing near complete degradation after 1.5 years of service. Note the accentuated hook joint and split at glue line. FIG. 9 is a photograph of hook joint defect causing breakdown of the undercoat paint system; whereas FIG. 10 shows the accentuated hook joint swelling and subsequent board splitting and coating failure. Finally, FIG. 11 is a photograph of a floor according to the present invention installed on a truck chassis.

Figure 12:
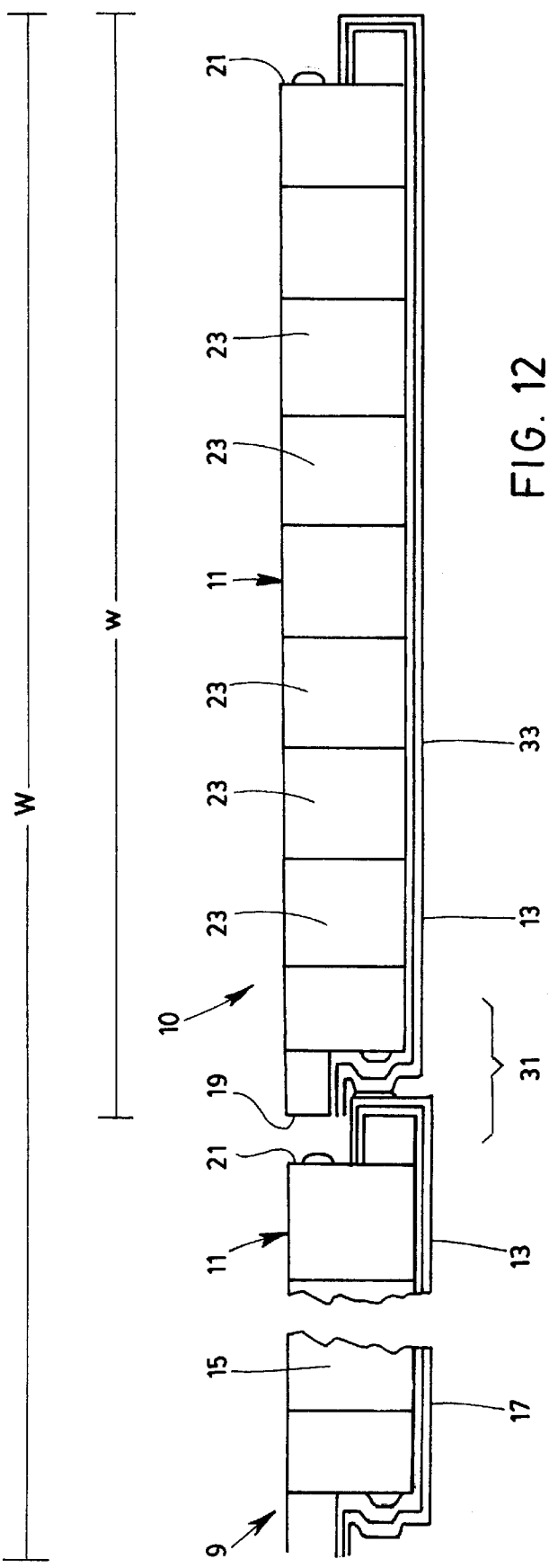
FIG. 12 is a cross-sectional area of a portion of a vehicular truck floor, showing two planks.
Figure 13:
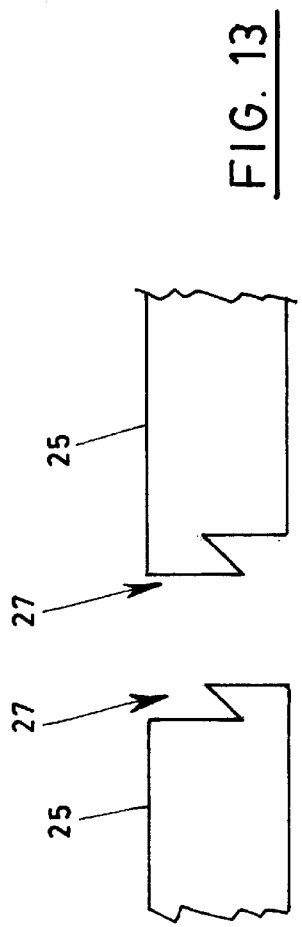
FIG. 13 is a schematic representation of the shaped coupling portions joining two pieces of wood end-to-end.

Referring now to FIGS. 12 and 13, the present invention concerns a plastic coated vehicular surface flooring system having a length and a width. The plastic coated vehicular system comprises the following elements: a plurality of wood planks 11 arranged side by side to form a floor, the planks having a substantially planar polymer 13 continuously bonded to the underside thereof.

The plurality of wood planks 11 extends longitudinally up to a length substantially equal to the length of the floor, each plank 11 having a top surface 15 and a bottom surface 17, and a first 19 and second 21 side surfaces extending between the top surface 15 and the bottom 17 surface. Each plank has a width that is less than the width of the floor. Each plank 11 is formed by a plurality of boards 23 arranged side-by-side, each board being formed of a plurality of segments 25 joined end-to-end to one another by shaped coupling portions 27. In a preferred embodiment of the invention, the wood boards are a hardwood, and is most preferably selected from the group consisting of oak, maple, birch, beach and larch.

As mentioned previously, the planks 11 is arranged side-by-side such that at least one of the first 19 and second 21 side surfaces of each of the planks 11 faces one of the second 21 or first 19 side surfaces of an adjacent plank 11 to form the floor 10, a joint region 31 being formed at locations where the first side surface faces the second side surface of adjacent planks.

In a preferred embodiment, the first side surface is provided with an upper lip portion, the second side surface is provided with a lower lip portion, and the first side surface of one of the planks which faces the second side surface of an adjacent plank forms a ship lap joint in which the upper lip portion at least partially overlies the lower lip portion. Further preferably, at least one of the first side surface and the second side surface is provided with a crusher bead to prevent the upper lip portion of the first side surface from fully overlying the lower lip portion of the second side surface of an adjacent board to form a gap at the region of the ship lap joint to allow for eventual expansion of the wood. In such a case, it is preferable for the unreinforced polymer layer to also cover both surfaces of the ship lap joint and also preferably, cover the horizontal position of the joint.

Each of the plurality of planks 11 of the floor further comprises a substantially planar polymer layer 13 formed of an unreinforced polymer, the polymer being substantially continuously bonded to the bottom surface 17 of each of the plurality of planks with an adhesive layer 33 and extending unitarily substantially across the width and along the longitudinal length of each plank 11, the upper surface 15 of each of the plurality of planks being uncoated by the un-reinforced polymer layer. Preferably, the plastic polymer layer possesses a modulus of elasticity less than that of the wood.

Depending on the type of adhesive used, it may be preferable if the boards are sanded prior to the application of the adhesive. Further preferably, the unreinforced polymer layer covers substantially all of the bottom surface of the planks, and partially or substantially covers the side surfaces of the floor. It will be also understood that the un-reinforced polymer layer can be applied in multiple layers at areas of especially high abrasive wear.

The polymer layer is preferably completely non-permeable to both liquid moisture and moisture vapor. The polymer layer, in a preferred embodiment of the invention, is selected from the group consisting of PVC, urethane, PET, polyethylene, polypropylene, acrylic, ABS, ASA, poly-urea, or other equivalent thermoplastic or thermo set un-reinforced polymer having a modulus of elasticity less than 1 MSI, a surface energy greater than 20 dynes, and an elongation greater than 20%.

Also preferably, the polymer layer has an elongation in excess of the wood substrate or wood bonding adhesives used in construction of the wood flooring system.

In a preferred embodiment of the invention, the adhesive layer is selected from the group consisting of epoxy, urethane, acrylic, hot melt, polyester, vinyl ester, reactive hot melt, or other equivalent thermo-set or thermoplastic adhesives preferably possessing low application viscosity when heated, high adhesion to wood substrate, fast processing times, and long-term moisture resistance.

Preferably, the adhesive layer is completely non-permeable to both liquid moisture and moisture vapor, and has a low application viscosity, high bond strength to wood, high bond strength to plastic and long-term moisture resistance.

The reactive hot-melt urethane or epoxy -PVC combination is the preferred version of the coating according to the present invention for the reasons of low cost, superior moisture resistance, good UV stability, excellent adhesion to wood and PVC, good printability, and availability in correct widths and thickness.

By using a two-component system, each component can be optimized for a specific task within the coating system. The viscosity of the epoxy or reactive hot-melt urethane is reduced in order to penetrate the wood so that the bond is strong and moisture resistant. If the adhesive penetrates the wood (sanding is important to open the grain with some types of glues) the bond will help to last in a wet environment. The PVC is preferably optimized to give the lower cost thickness and provide a single, uniform sheet barrier to moisture. The PVC also has very high toughness that gives it the best wear resistance and ability to absorb strain (stretch) as the wood swells due to absorbed moisture or temperature changes. In a sand blast test, the PVC was shown to give a two order of magnitude increase in wear resistance. The particular epoxy adhesive (especially the hardener components), and the reactive hot-melt urethane combined with the PVC thermoplastic represent the best bonding and lowest cost system that we were able to test. The bond developed between the combination of either of the adhesives and the PVC is especially strong, and results in the failure of the substrates and not the bond.

When the PVC is peeled off (during peel-off tests or physically removed), the wood or PVC will fail and there will not be an adhesive (plastic peels off wood with no adhesive attached) or cohesive (plastic peels off wood with some adhesive attached to both surfaces) failure. Instead, the substrate failure results in the failure of the PVC or the wood.

Particular to the use of reactive hot melt urethanes, the hot melt system is particularly well suited to the application, as the material can be applied at high speed with precise coverage and thickness control, is instantly "sticky", eliminating the need for expensive presses, and subsequent to application cures to form a high strength chemical bond to the base wood using only the moisture in the wood as one key component in the reaction.

The system according to a preferred embodiment of the invention, i.e. epoxy or reactive hot-melt urethane and PVC together will outperform the current paint system for several reasons.

First it is thicker, 0.016" vs 0.004" for the current paint (0.0406 cm vs 0.0101 mm). Second, the epoxy or the reactive hot-melt urethane penetrates the wood grain. Third, the PVC layer creates a single sheet with no imperfections or wood fiber component (like the paint) that can absorb wear, keep out moisture and stretch with the strains of the floor in use. Moisture exposure test have shown that high strain capability of the PVC (187%) is an important aspect to maintaining the coating integrity during severe long term moisture exposure. Systems with lower strain capability consistently fail due to "over strain" of the coating system, especially at the joints between sticks. Because the un-reinforced thermoplastic moisture barrier has a modulus of elasticity lower than that of the wood, the system will not warp during exposure to high moisture. Generally, systems using fiber reinforced plastic or other high modulus sheets have been shown to consistently warp during extreme moisture testing, due to the unbalanced effects of the use of a high modulus sheet material on the wood substrate. Last, the PVC sheet can "bridge" over gaps, defects, knots, and the critical area of the hook joints, making the floor look more uniform, also requiring less prep work in the manufacturing process. The ability of the sheet to bridge the gaps discussed above and stretch with the normal swelling and structural stresses of the floor in use is an important aspect to the performance of the new coating system. Because of these attributes, the coating will keep all the water out of the wood and away from the customer's product. The uneven swelling stresses that work to breakdown the current system never occur, and if they do, the sheet system can handle the strain required to limit the problem to only a small area where the coating may have been damaged from some abnormal event. The PVC sheet is also printable for effective marketing of the floor. Finally, since the PVC sheet can be layered, additional layers can be placed on areas of high wear (above the wheel locations) to create an engineered wear layer where the problem is most pronounced.

The following tests were performed in order to demonstrate the advantages of the present invention.

In an abrasion test, sand was projected from a distance toward a sample coated with a waterbase paint and a sample coated with PVC. The material projected was broken glass, #20–30 gauge. The results are shown in Table 1:

| ABRASION TEST | | | | |
|---|---|---|---|---|
| Sample | Projection Distance | Material projected | Undercoat | Time before perforation occurred |
| #1 | 10" | Sand (big) | Waterbase | 2 sec. |
| #2 | 10" | Sand (big) | Waterbase | 2 sec. |
| #3 | 10" | Sand (big) | PVC | 75 sec. |
| #4 | 10" | Sand (big) | PVC | 105 sec. |
| #5 | 10" | Sand (big) | PVC | 80 sec. |
| #6 | 10" | Sand (big) | PVC | 100 sec. |

Another test was conducted, where planks with different undercoats were exposed to the outside elements. The surface that is coated is placed in a rack, face up towards the sky. The results appear in Table 2:

OUTSIDE CONDITION TEST

| Observation interval | Comments |
|---|---|
| Sample 1: Water base undercoat | |
| 1 week | Wood starts to swell around the joint. No delamination |
| 1 month | Almost all the wood around the joint are swelled. |
| | Little crack start to appear on each end of the board |
| 6 months | Superficial surface delamination on some areas |
| | Around the joints, the wood is swollen |
| | Cracks on the end of the plank are more visible and deeper |
| 9 months | Surface delamination is more visible. |
| | Deeper cracks (delamination) around the joint |
| Sample 2: PVC protection with epoxy glue | |
| 1 week | Nothing |
| 1 month | Little cracks start to appear on each end of the plank |
| | No cracks and no swelling around the joint |
| 6 months | Cracks on the end of the board are more visible and deeper |
| | No cracks and no swelling around the joint |
| | PVC starts to stretch, but not crack |
| 9 months | No cracks and no swelling around the joint |
| | More stretching visible on the PVC, but no crack |
| | PVC still well bonded to the wood. |

As can be seen, the present invention provides definite advantages over the prior art.

Although the present invention has been explained hereinabove by way of a preferred embodiment thereof, it should be pointed out that any modifications to this preferred embodiment within the scope of the appended claims is not deemed to alter or change the nature and scope of the present invention.

What is claimed is:

1. A plastic coated vehicular surface flooring system having a longitudinal length and a lateral width, said plastic coated vehicular flooring system comprising:

a. a plurality of wood planks extending longitudinally up to a length substantially equal to the longitudinal length of said floor, each plank having a top surface, a bottom surface opposite said top surface, and a first and second side surfaces extending between said top surface and said bottom surface, where said plank has a width that is less than the lateral width of said floor, each plank being formed by a plurality of boards arranged side-by-side, each board being formed of a plurality of segments joined end-to-end to one another by shaped coupling portions;

b. said plurality of planks being arranged side by side such that at least one of said first and said second side surfaces of each of said planks faces one of said second or first side surfaces of adjacent planks to form a floor substrate, a joint region being formed at locations at which said first side surface faces said second side surface of adjacent planks; and c. each of the plurality of planks of said plastic coated vehicular surface floor further comprising a substantially planar polymer layer formed of an un-reinforced polymer, said polymer layer being substantially continuously bonded to said bottom surface of each of the plurality of planks with an adhesive layer and extending unitarily substantially across the width and along the longitudinal length of each plank, the upper surface of each of the plurality of planks being uncoated by the un-reinforced polymer layer, where said plastic polymer layer possesses a modulus of elasticity less than 1 MSI and an elongation greater than 20%.

2. A plastic coated vehicular surface flooring system according to claim 1, wherein said plurality of wood boards are hardwood boards.

3. A plastic coated vehicular surface flooring system according to claim 2, wherein said hardwood is selected from the group consisting of oak, maple, birch, beach, and larch.

4. A plastic coated vehicular surface flooring system according to claim 1, wherein said polymer layer is completely non-permeable to both liquid moisture and moisture vapor, and said plastic layer has an elongation in excess of the wood substrate or wood bonding adhesives used in construction of the plastic coated vehicular surface flooring system.

5. A plastic coated vehicular surface flooring system according to claim 1, wherein said polymer layer is selected from the group consisting of PVC, urethane, PET, polyethylene, polypropylene, acrylic, ABS, ASA, poly-urea, or other equivalent thermoplastic or thermo set un-reinforced polymer.

6. A plastic coated vehicular surface flooring system according to claim 1, wherein said adhesive layer is completely non-permeable to both liquid moisture and moisture vapor, and said adhesive layer has a low application viscosity, high bond strength to wood, high bond strength to plastic, and long-term moisture resistance.

7. A plastic coated vehicular surface flooring system according to claim 2, wherein said adhesive layer is completely non-permeable to both liquid moisture or moisture vapor, and said adhesive layer has a low application viscosity, high bond strength to wood, high bond strength to plastic, and long-term moisture resistance.

8. A plastic coated vehicular surface flooring system according to claim 3, wherein said adhesive layer is completely non-permeable to both liquid moisture or moisture vapor, and said adhesive layer has a low application viscosity, high bond strength to wood, high bond strength to plastic, and long-term moisture resistance.

9. A plastic coated vehicular surface flooring system according to claim 1, wherein said adhesive layer is completely non-permeable to both liquid moisture or moisture vapor, and said adhesive layer has a low application viscosity, high bond strength to wood, high bond strength to plastic, and long-term moisture resistance.

10. A plastic coated vehicular surface flooring system according to claim 1, wherein said polymer layer is completely non-permeable to both liquid moisture or moisture vapor, and said plastic layer has an elongation in excess of the wood substrate or wood bonding adhesives used in construction of the plastic coated vehicular surface flooring system.

11. A plastic coated vehicular surface flooring system according to claim 2, wherein said polymer layer is completely non-permeable to both liquid moisture or moisture vapor, and said plastic layer has an elongation in excess of the wood substrate or wood bonding adhesives used in construction of the plastic coated vehicular surface flooring system.

12. A plastic coated vehicular surface flooring system according to claim 3, wherein said polymer layer is completely non-permeable to both liquid moisture or moisture vapor, and said plastic layer has an elongation in excess of the wood substrate or wood bonding adhesives used in construction of the plastic coated vehicular surface flooring system.

13. A plastic coated vehicular surface flooring system according to claim 3 wherein said boards are sanded prior to application of said adhesive.

14. A plastic coated vehicular surface flooring system according to claim 1 wherein said adhesive layer is selected from the group consisting of epoxy, urethane, acrylic, hot melt, polyester, vinyl ester, reactive hot melt, or other equivalent thermo-set or thermoplastic adhesives possessing low application viscosity, high adhesion to wood substrate, fast processing times, and long-term moisture resistance.

15. A plastic coated vehicular surface flooring system according to claim 3, wherein said unreinforced polymer layer covers both substantially 100 percent of said bottom surface, and partially or substantially covers both side surfaces of said floor.

16. A plastic coated vehicular surface flooring system according to claim 1 wherein said un-reinforced polymer layer is applied in multiple layers at areas of especially high abrasive wear.

17. A plastic coated vehicular surface flooring system according to claim 1 wherein said first side surface is provided with an upper lip portion, said second side surface is provided with a lower lip portion, and said first side surface of one of said planks which faces said second side surface of an adjacent plank forms a ship lap joint in which said upper lip portion at least partially overlies said lower lip portion.

18. A plastic coated vehicular surface flooring system according to claim 13, wherein at least one of said first side surface and said second side surface is further provided with a crusher bead to prevent said upper lip portion of said first side surface from fully overlying said lower lip portion of said second side surface of an adjacent board to form a gap at the region of said ship lap joint.

19. A plastic coated vehicular surface flooring system according to claim 17, wherein said un-reinforced polymer layer covers both substantially 100 percent of said bottom surface, and partially or substantially covers both side surfaces of the ship lap joint.

* * * * *